United States Patent [19]

Tanaka et al.

[11] Patent Number: 4,603,383
[45] Date of Patent: Jul. 29, 1986

[54] APPARATUS FOR DIRECT DATA TRANSFER AMONG CENTRAL PROCESSING UNITS

[75] Inventors: Atsuyuki Tanaka, Shinshiro; Yukio Tadauchi, Toyohashi; Shozo Kaieda, Toyokawa, all of Japan

[73] Assignee: Minolta Camera Kabushiki Kaisha, Osaka, Japan

[21] Appl. No.: 697,478

[22] Filed: Feb. 1, 1985

Related U.S. Application Data

[63] Continuation of Ser. No. 327,019, Dec. 3, 1981, abandoned.

[30] Foreign Application Priority Data

Dec. 5, 1980 [JP] Japan .................. 55-172460

[51] Int. Cl.$^4$ .................. G06F 15/16; G06F 3/04; G06F 13/00
[52] U.S. Cl. .................. 364/200; 364/900
[58] Field of Search ... 364/200 MS File, 900 MS File

[56] References Cited

U.S. PATENT DOCUMENTS

| | | | |
|---|---|---|---|
| 4,041,472 | 8/1977 | Shah et al. | 364/900 |
| 4,096,571 | 6/1978 | Vander Mey | 364/200 |
| 4,096,572 | 6/1978 | Namimoto | 364/200 |
| 4,153,934 | 5/1979 | Sato | 364/200 |
| 4,204,251 | 5/1980 | Brudevold | 364/200 |
| 4,214,305 | 7/1980 | Tokita et al. | 364/900 |
| 4,237,534 | 12/1980 | Felix | 364/200 |
| 4,263,649 | 4/1981 | Lapp, Jr. | 364/200 |
| 4,314,335 | 12/1982 | Pezzl | 364/200 |

*Primary Examiner*—Gary V. Harkcom
*Attorney, Agent, or Firm*—Price, Gess & Ubell

[57] ABSTRACT

A data processing system wherein one of a number of central processing units writes a command for data transfer to it from a second processor over a data bus to a common memory and a digital code to an interrupt table, the code indicating interruption of the second processor. Decoding apparatus responsive to the digital code causes the second central processor to read the command for data transfer from the memory and transfer data to the first central processor.

4 Claims, 10 Drawing Figures

APPARATUS FOR DIRECT DATA TRANSFER AMONG CENTRAL PROCESSING UNITS

This is a continuation of application Ser. No. 327,019 filed on Dec. 3, 1981, now abandoned.

BACKGROUND OF THE INVENTION

The present invention relates to data transfer and more particularly, to a control method of data transfer among a plurality of central processing units (CPUs).

In conventional methods of data transfer among a plurality of CPUs, it has been so arranged, for example, that dedicated data transfer lines LA, LB, LC, LD and LE are provided between the two corresponding CPUs of a No. 1 CPU A, a No. 2 CPU B, a No. 3 CPU C and a No. 4 CPU D as shown in FIG. 1. However, the known arrangement of the above described type has such disadvantages that an increasing number of dedicated data transfer lines are required to be provided as CPUs are increased in number, resulting in complicated data transfer, and rise in the hazard rate and cost.

Furthermore, in the case where a printer is provided with various external terminals such as a plurality of a cathode ray tube (CRT), a keyboard, etc. each of which is connected with a CPU through an interface and more particularly, a printer of a line scanning type such as a laser beam printer is provided with a character generator, a video terminal, a CRT, etc. each of which is connected with a CPU through an interface or a relatively small-sized bus connection is formed by, for example, providing terminals in the housing of the printer, the conventional method of the above-described type has such inconveniences as necessity of dedicated ICs, complicated protocol, difficulty in synchronization of operations of output units, increase in the cost etc.

SUMMARY OF THE INVENTION

Accordingly, an essential object of the present invention is to provide an improved control method of data transfer, which comprises the steps of, writing in a common memory, a request for data transfer from each CPU and causing each CPU to read the request so as to transfer the data through identification of the corresponding destination CPU with substantial elimination of the disadvantages inherent in conventional control methods of data transfer of this kind.

Another important object of the present invention is to provide an improved control method of data transfer of the above described type which is simple in configuration, highly reliable in actual use, and easy in synchronizing operation of a data processing unit with those of output units.

In accomplishing these and other objects according to the present invention, there is provided a memory for storing a command table and an interrupt table, the command table including storage locations for commands indicating data transfer from one central processing unit to another central processing unit. Each central processing unit is capable of writing a command for data transfer to the command table and a digital code to the interrupt table. In response to the digital code, the processor from which data is to be transferred is interrupted, caused to read the command written into the memory, and to then transfer data to the central processor which originally wrote the command into memory. The invention further contemplates the method involved in transferring data among a multiplicity of central processing units, as more fully brought out in the appended claims.

In accordance with the present invention, the need for dedicated data transfer lines among CPUs has been eliminated and therefore, the configurations of the hardware and software have been remarkably simplified, resulting in an outstanding decrease in the cost.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
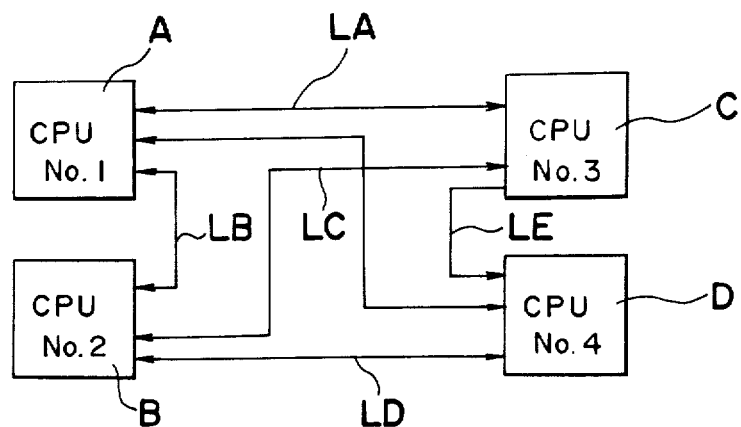
FIG. 1 is a circuit diagram showing a conventional method of transferring data among a plurality of CPUs.
Figure 2:
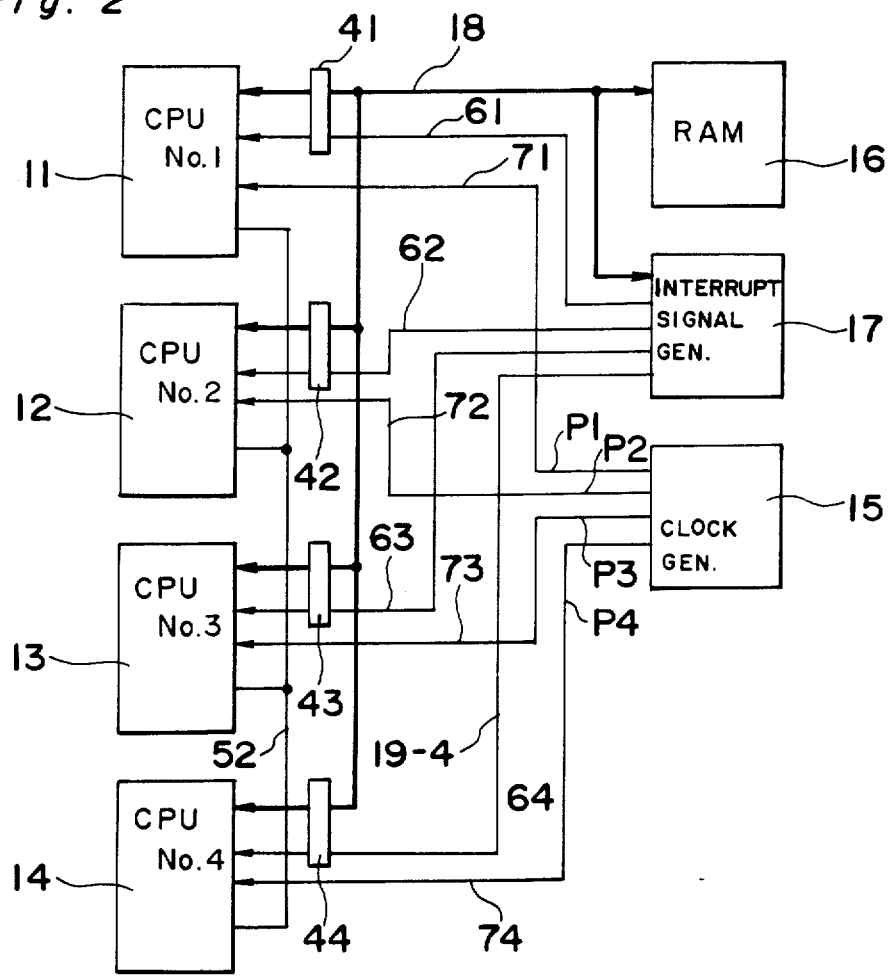
FIG. 2 is a circuit diagram of data transfer among a plurality of CPUs according to the present invention.
Figure 3:
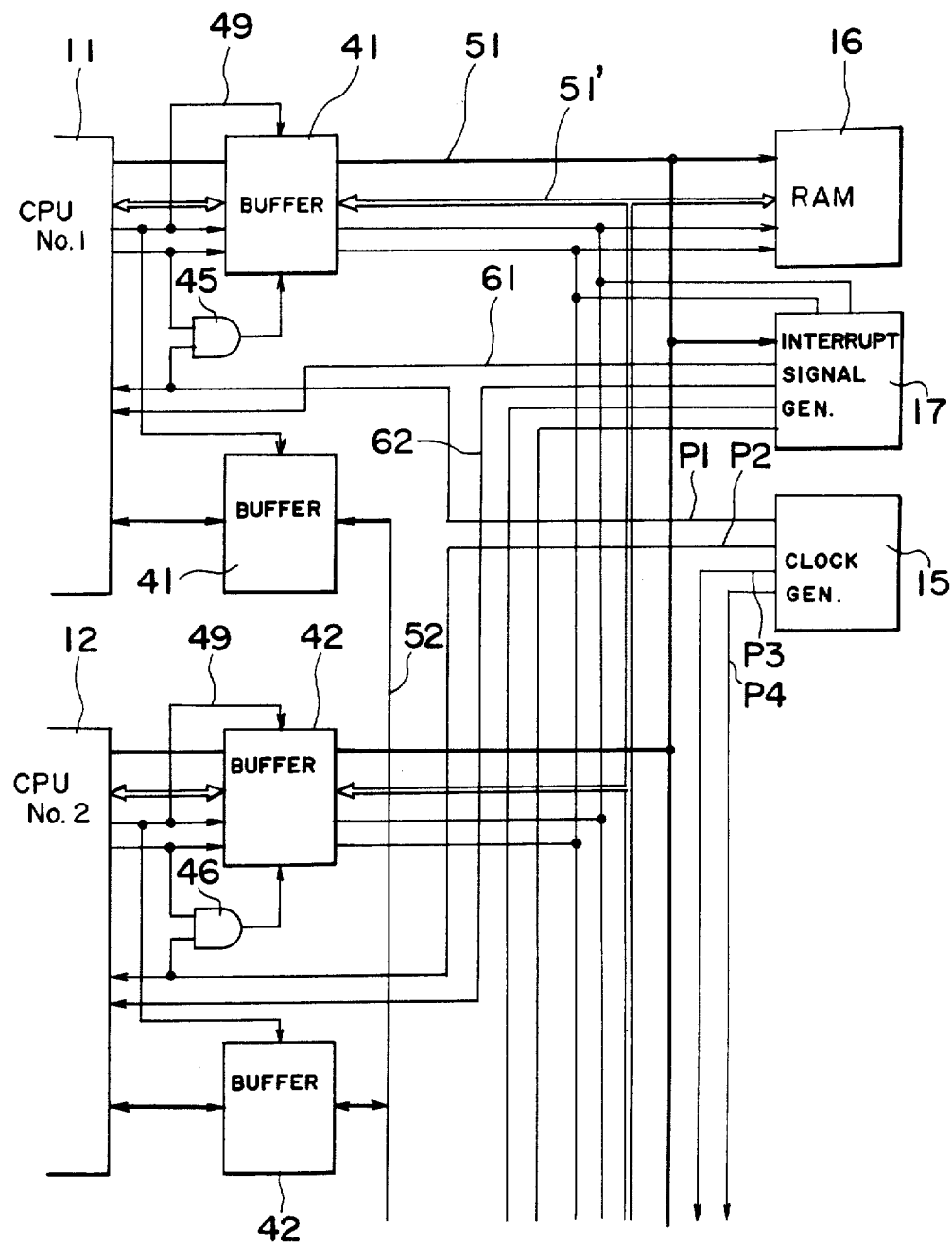
FIG. 3 is a circuit diagram showing a part of FIG. 2 in detail.

Referring now to the drawings, there is shown in FIGS. 2 and 3 a circuit diagram of data transfer according to the present invention, which includes a No. 1 CPU 11, a No. 2 CPU 12, a No. 3 CPU 13, and a No. 4 CPU 14. The CPU 11 is provided for operational control of a printer and the CPUs 12 to 14 are provided for operational control of terminals connected with the printer, such as a display unit, a character generator, etc.

Figure 4:
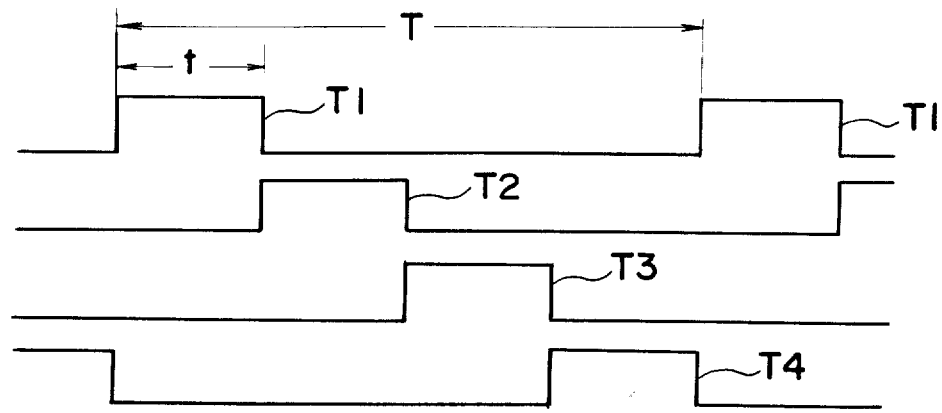
FIG. 4 is a timing chart explanatory of operations of data transfer of FIG. 2.

It is so arranged that the CPUs 11, 12, 13 and 14 are, respectively, operated on a time-sharing basis at the timing of T1, T2, T3 and T4 upon receipt of strobe pulses P1, P2, P3 and P4 generated from a timing clock generator 15 as shown in FIG. 4.

Figure 5:
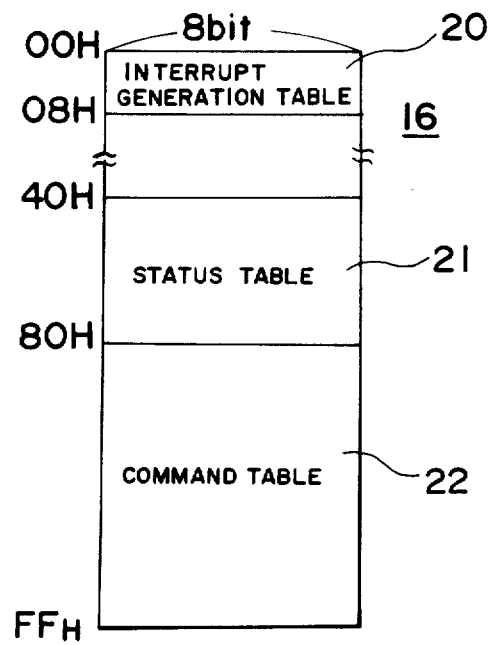
FIG. 5 is a memory map of a memory employed for data transfer of FIG. 2, FIGS. 6 to 8 are detailed views of FIG. 5, and FIGS. 9(a) and 9(b) are flow charts showing processing sequences of operational control of data transfer of FIG. 2.
Figure 6:
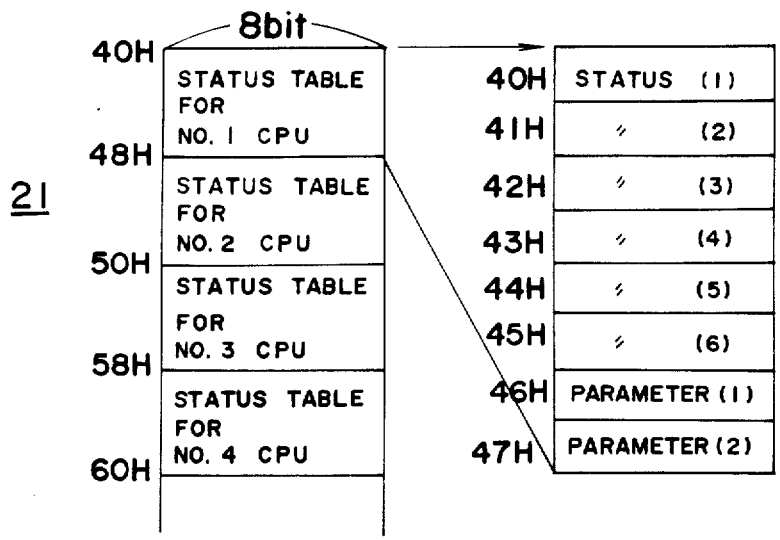
Figure 7:
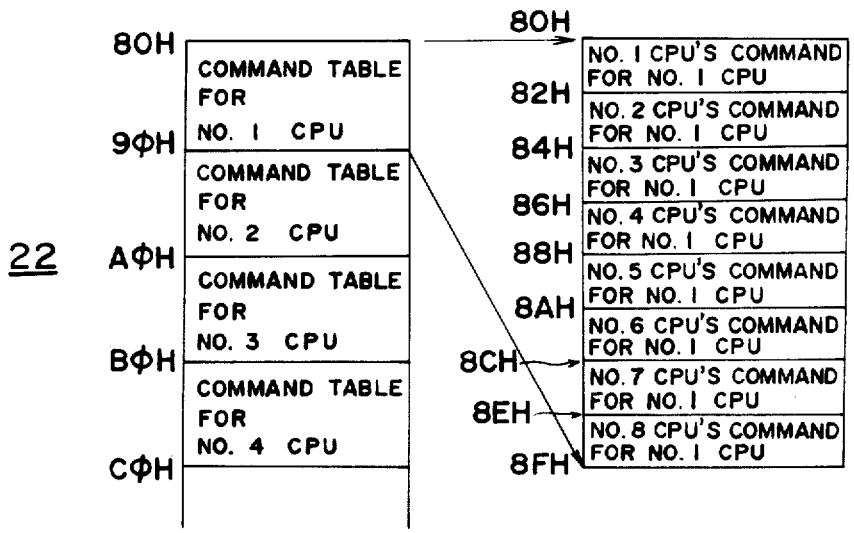

A memory 16 is provided so as to be used in common by the CPUs 11 to 14 and is composed of an interrupt generation table 20 for indicating an interruption of each CPU, a status table 21 for indicating operational statuses of each CPU and a command table 22 for storing operational commands of each CPU as shown in FIGS. 5 to 7.

Addresses 0 to 8 of the memory 16 are allotted for the interrupt generation table 20 and dummy data is written at one of the addresses 0 to 8, corresponding to an address of a destination CPU to be interrupted.

Referring to FIG. 6, addresses 40H to 60H of the memory 16, expressed in hexadecimal notation, are alloted for the status table 21 and, for example, addresses 40H to 47H are used for the No. 1 CPU 11 so that statuses (1) to (6) and parameters (1) and (2) may be written thereat, respectively.

Referring to FIG. 7, addresses 80H to C0H of the memory 16 are alloted for the command table 22 so as to store commands for each CPU. It is to be noted that the command table 22 is provided so as to detect the presence of a request from each CPU and a content of the request and a command is set at the corresponding address by the CPU at the request side. For example, the command table for the No. 1 CPU 11 comprises 16 bytes from the address 80H to the address 8FH and corresponding two bytes form a command table of each CPU for the CPU 11. Accordingly, for example, in the case where the No. 2 CPU 12 gives a command to the No. 1 CPU 11, the No. 2 CPU 12 sets the command at the address 82H so as to make the above-described interrupt request.

Figure 8:
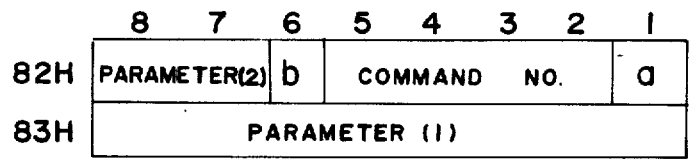

Referring to FIG. 8, there is shown one example of a format of a command table comprising two bytes, i.e. addresses 82H and 83H. The 1st bit of the address 82H is a request flag a. The request flag a selectively indicates that there is a command request from a CPU and the request has been received in the case of a = "1" and a = "0", respectively. Four bits from the 2nd bit of the address 82H to the 5th bit thereof are allotted for a command No. for expressing 16 kinds of commands such as operation of a printer, etc. The 6th bit of the address 82H is an answer flag b corresponding to a request command. The answer flag b selectively becomes the request command and answer command in the case of b = "0" and b = "1", respectively. For example, supposing that an initialization request command of a CPU is "011111", a command for indicating that the initialization request command has been completed becomes "111111". The 7th and 8th bits of the address 82H is a parameter (2) and the address 83H is a parameter (1). The parameters (1) and (2) are spare bits for open-ended purpose.

Meanwhile, as shown in FIG. 3, high-speed buffers 41, 42, 43 and 44 are provided between the memory 16/interrupt signal generator 17, and the CPUs 11, 12, 13 and 14, respectively. The interrupt signal generator 17 is, for example, a decoder and generates an output corresponding to an input having a code pattern. Accordingly, the interrupt signal generator 17 receives an input of address information and timing clock and generates an output corresponding to the address information. When a statement is written at a predetermined address of the memory 16, the same address signal is fed to the interrupt signal generator 17 so as to generate an interrupt signal corresponding to the predetermined signal.

Meanwhile, as shown in FIG. 3, the high-speed buffers 41, 42, 43 and 44 are caused to be in an operative state by output signals from AND gates 45, 46, 47 (not shown) and 48 (not shown). The timing signals P1, P2, P3 and P4 from the timing clock generator 15 are fed to one input of the AND gates 45, 46, 47 and 48, respectively. At the timing of T1, the AND gate 45 is caused to be operative and thus, the high-speed buffer 41 is actuated so as to select the CPU 11.

Since operation of the other high-speed buffers 42, 43 and 44 is the same as that of the high-speed buffer 41, the description thereof is abbreviated for brevity. It should be noted that, since the high-speed buffers 41 to 44 are of a bi-directional type, operational direction of each buffer is selected when a directional selection signal 49 for determining the operational direction of each buffer is fed from each CPU to the corresponding buffer.

Meanwhile, referring again to FIGS. 2 and 3, there are shown an address data bus 51, a high-speed data bus 52, interrupt signal lines 61, 62, 63 and 64, and timing signal lines 71, 72, 73 and 74 for time-sharing purpose.

Figure 9A:
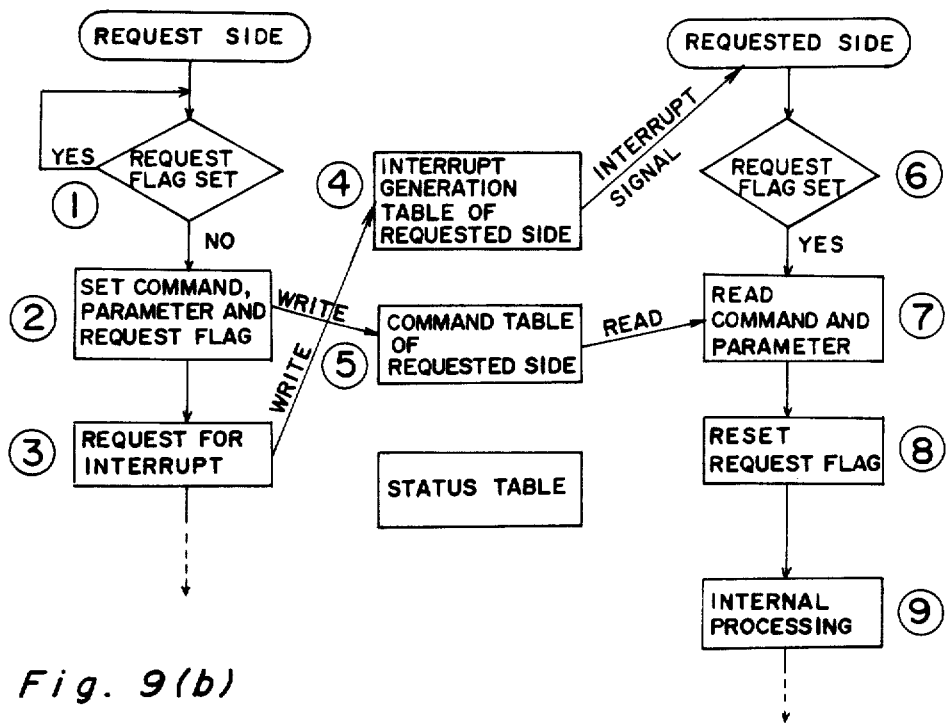

Now, one example of processing sequence, in the case where a request for data transfer is made from the No. 2 CPU 12 to the No. 1 CPU 11, namely, data of the No. 1 CPU 11 is transferred to the No. 2 CPU 12, will be described with reference to FIG. 9(a).

A statement for indicating whether each CPU is in a status enabling reading and writing, i.e. in a ready status or in operation, i.e. in a busy status at the timing T1 to T4 alloted for the CPU 11 to 14, respectively is written at the corresponding address of the status table 21 of the memory 16. Namely, in the case of the No. 1 CPU 11, a statement for indicating whether the No. 1 CPU 11 is in a ready status or in a busy status is written at the address 40H.

Meanwhile, when a request for data transfer has been made from the No. 2 CPU 12 to the No. 1 CPU 11 at a step ① and the strobe pulse P2 is generated from the timing clock generator 15, an output of the AND gate 46 for the No. 2 CPU 12 becomes "1" so as to operate the high-speed buffer 42, so that the contents of the data transfer, i.e. the command, parameters and request flag a are fed to the memory 16 at a step ②. An interrupt request is made from the No. 2 CPU 12 at a step ③, and then, a signal for designating the No. 1 CPU 11 from the interrupt signal generator 17 together with dummy data is written at the 1st address of the interrupt generation table 20 of the memory 16 at a step ④.

Then, at a step ⑤, the command from the No. 2 CPU 12 is written at the address 82H to 84H of the command table 22 of the memory 16. Then, if it is found at a step ⑥ that the request flag a is "1", that is, there is a request from the No. 2 CPU 12, the No. 1 CPU 11 reads the command table 22 through so as to decide that the request flag a is "1", that is, the request for the data transfer is made from the No. 2 CPU 12 to the No. 1 CPU 11.

Then, the No. 1 CPU 11 transfers the requested data to the No. 2 CPU 12 through the high-speed buffers 41 and 42 by skipping the memory 16. When the data transfer has been completed, the high-speed buffers 41 and 42 are closed, the request flag a is reset at a step ⑧ and an internal processing for the command is performed at a step ⑨.

Figure 9B:
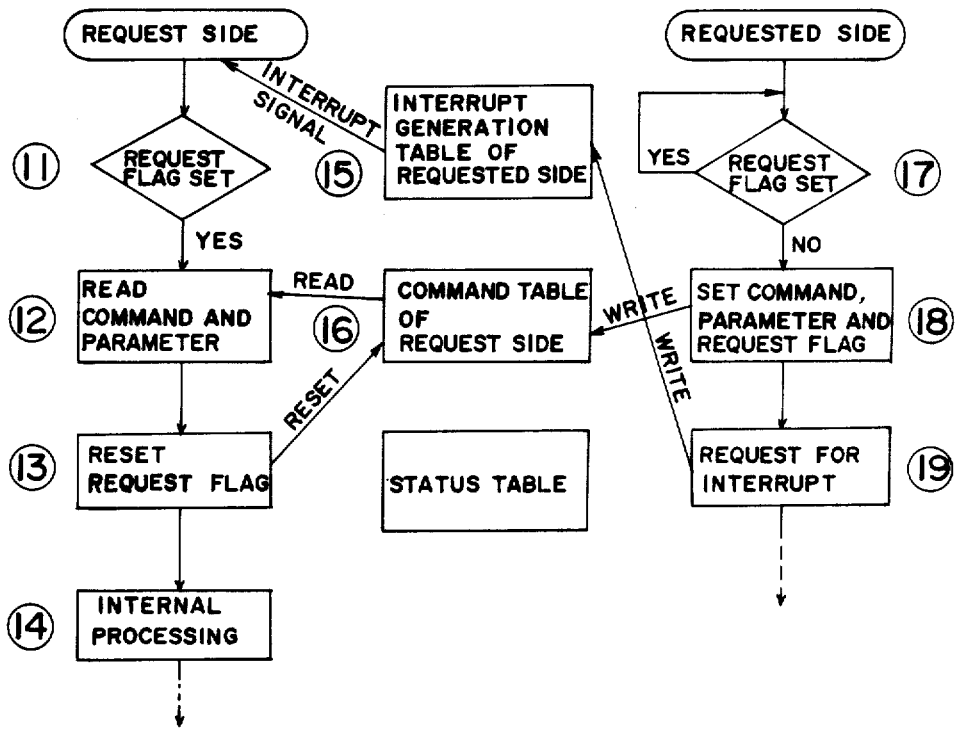

Meanwhile, FIG. 9(b) shows processing sequence in the case where a request for data transfer is made from the No. CPU 11 to the No. 2 CPU 12. Since the processing sequence of FIG. 9(b) is quite similar to that of FIG. 9(a), the description thereof is abbreviated for brevity. It is to be noted that data transfer between other CPUs is performed in the same manner as described above.

As is clear from the foregoing description, in an improved control method of data transfer according to the present invention, a plurality of CPUs are provided with a common memory and a request for data transfer is written in the memory, so that the requested CPU transfers the predetermined data to the destination CPU through high-speed buffers and a special high-speed data bus upon reading the stored content in the memory.

Accordingly, in accordance with the present invention, the need for dedicated buses among CPUs has been eliminated through simplified buses between CPUs and the memory and the requested data are transferred through the high-speed buffers and special high-speed data bus, so that data processing can be synchronized with operation of output units easily even in the case where high-speed data processing is required, for example, in the case of a video signal. Another advantage of the present invention is that data transfer can be performed even when the memory is being used.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. Apparatus for accomplishing data transfer between first and second central processor means comprising:

memory means for storing a command table and an interrupt table, said command table including a storage location for a first command, said first command comprising a command to said second central processor means to transfer selected digital data to said first central processor means;

said first central processor means being operative to write said first command into said storage location in said memory means and to subsequently write a first digital code to a location in said interrupt table, said code indicating interruption of said second central processor means;

decoder means responsive to writing of said first digital code into said memory means to generate a first interrupt to said second central processor means prior to data transfer to said second processor means;

first, second and third buffer means, said first and second buffer means having respective first and second outputs connected for transferring data to and from said first central processor means, said third buffer means having a third output connected for transferring data to and from said second processor means, said second and third buffer means having their respective outputs connected for data transfer over a common bus means, the bus means providing for direct data transfer without intermediate storage between said second and third buffer means;

said second central processor means being responsive to said first interrupt to read said first command from said memory means and to transfer said selected digital data over said bus means through said second and third buffer means to said first central processor means in response to said first command;

wherein said first command and first digital code are written to said memory means through said first buffer means by said first central processor means.

2. The apparatus of claim 1 wherein said command table further contains storage space for at least a second command designating transfer of selected digital data from said first central processing means to said second central processor means, said second central processor means being operative to write a second command for data transfer from said first central processor means into said memory means and to write a second digital code to a location in said interrupt table, said second digital code indicating interruption of said first central processor means; said decoder means being responsive to writing of said second digital code to generate a second interrupt to said first central processor means; said first central processor means being responsive to said second interrupt to read said second command from said memory means and to transfer said selected digital data to said second central processor means in response to said second command.

3. The apparatus of claim 1 wherein said first command contains a plurality of bits indicating an operation to be performed and at least one bit which may be set to indicate the operation has been performed.

4. The apparatus of claim 1 further including means for controlling writing of a said digital code by said first central processor means to occur only during a selected time slot.

* * * * *